(12) United States Patent
Sekido et al.

(10) Patent No.: US 8,853,996 B2
(45) Date of Patent: Oct. 7, 2014

(54) VEHICLE CHARGING PORT ARRANGEMENT

(75) Inventors: Kiyohito Sekido, Yokohama (JP); Satoshi Shigematsu, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 639 days.

(21) Appl. No.: 13/260,640

(22) PCT Filed: May 25, 2010

(86) PCT No.: PCT/IB2010/001231
§ 371 (c)(1),
(2), (4) Date: Sep. 27, 2011

(87) PCT Pub. No.: WO2010/143040
PCT Pub. Date: Dec. 16, 2010

(65) Prior Publication Data
US 2012/0019206 A1    Jan. 26, 2012

(30) Foreign Application Priority Data

Jun. 11, 2009 (JP) ................. 2009-139895

(51) Int. Cl.
*H02J 7/14* (2006.01)
*H02J 7/00* (2006.01)
*B60K 1/00* (2006.01)
*B60L 11/18* (2006.01)

(52) U.S. Cl.
CPC ......... *B60L 11/1877* (2013.01); *B60L 11/1818* (2013.01); *B60L 11/1803* (2013.01); *Y02T 10/7088* (2013.01); *Y02T 10/705* (2013.01); *B60L 11/185* (2013.01); *Y02T 90/121* (2013.01); *Y02T 10/7005* (2013.01); *Y02T 90/128* (2013.01); *Y02T 90/14* (2013.01)
USPC .......................... 320/104; 320/109; 180/65.1

(58) Field of Classification Search
USPC .............. 320/104, 107, 109; 180/65.1, 65.21; 191/1, 2, 12.1, 12.2
See application file for complete search history.

(56) References Cited

U.S. PATENT DOCUMENTS 5,202,617 A * 4/1993 Nor .............................. 320/130
5,498,948 A * 3/1996 Bruni et al. .................. 320/108
(Continued)

FOREIGN PATENT DOCUMENTS

CN       1824556 A    8/2006
CN     101415473 A    4/2009
(Continued)

OTHER PUBLICATIONS

A Written Opinion of the International Search Authority for International Application No. PCT/IB2010/001231, dated Oct. 4, 2010, mailed Oct. 12, 2010.

(Continued)

*Primary Examiner* — Richard V Muralidar
*Assistant Examiner* — Michael Dibenedetto
(74) *Attorney, Agent, or Firm* — Global IP Counselors, LLP

(57) ABSTRACT

A vehicle charging port arrangement is provided with a vehicle body, an electric charging port and a charging-in-progress indicator. The vehicle body includes a vehicle cabin and a vehicle front end portion having an upper surface. The electric charging port is arranged on the vehicle front end portion. The electric charging port is configured to receive an electric charging connector. The charging-in-progress indicator is movably mounted to the vehicle front end portion to move in a vertical direction between a charging port access position that provides access to the electric charging port and a charging port blocking position that prevents access to the electric charging port. The charging-in-progress indicator is visible from inside the vehicle cabin looking over the upper surface of the vehicle front end portion while the charging-in-progress indicator is in the charging port access position.

21 Claims, 7 Drawing Sheets

(56) References Cited

U.S. PATENT DOCUMENTS

| | | | |
|---|---|---|---|
| 5,523,666 A * | 6/1996 | Hoelzl et al. | 320/109 |
| 5,850,135 A * | 12/1998 | Kuki et al. | 320/108 |
| 5,855,262 A * | 1/1999 | Jackson | 191/12.4 |
| 6,037,745 A * | 3/2000 | Koike et al. | 320/104 |
| 7,999,506 B1 * | 8/2011 | Hollar et al. | 320/104 |
| 8,125,180 B2 * | 2/2012 | Grider et al. | 320/104 |
| 8,427,103 B2 * | 4/2013 | Ohtomo | 320/109 |
| 8,428,802 B2 * | 4/2013 | Kizaki | 701/22 |
| 8,452,661 B2 * | 5/2013 | Karch et al. | 705/16 |
| 2001/0003413 A1 * | 6/2001 | Kajiura | 320/108 |
| 2006/0185917 A1 | 8/2006 | Ozeki et al. | |
| 2007/0045013 A1 | 3/2007 | Bergum | |
| 2009/0079389 A1 | 3/2009 | Ohtomo | |
| 2010/0109604 A1 * | 5/2010 | Boys et al. | 320/109 |
| 2011/0193521 A1 * | 8/2011 | Ichikawa | 320/109 |

FOREIGN PATENT DOCUMENTS

| | | |
|---|---|---|
| EP | 1291947 B1 | 11/2007 |
| EP | 2039560 A1 | 3/2009 |
| JP | 9-285022 | 10/1997 |
| JP | 09-285022 A | 10/1997 |
| JP | 10-152071 | 6/1998 |
| JP | 10-152071 A | 6/1998 |
| JP | 11-332024 | 11/1999 |
| JP | 11-332024 A | 11/1999 |
| JP | H11-332003 | 11/1999 |
| JP | 2009-77557 | 4/2009 |
| JP | 2010-148299 | 7/2010 |

OTHER PUBLICATIONS

An English translation of the Chinese Notification of Opinion upon First Examination of corresponding Chinese Application No. 201080025873.8, issued on Jul. 22, 2013.

An English translation of the Decision on Grant for the corresponding Russian patent application No. 2011153374 issued on Dec. 13, 2013.

* cited by examiner

US 8,853,996 B2

VEHICLE CHARGING PORT ARRANGEMENT

CROSS-REFERENCE TO RELATED APPLICATIONS

This application is a U.S. National stage of International Application No. PCT/IB2010/001231, filed May 25, 2010, which claims priority to Japanese Patent Application No. 2009-139895, filed Jun. 11, 2009. The entire disclosure of Japanese Patent Application No. 2009-139895 is hereby incorporated herein by reference.

BACKGROUND

1. Field of the Invention

The present invention generally relates to a vehicle charging port arrangement for a charging port lid of an electric vehicle. More specifically, the present invention relates to a vehicle charging port arrangement that is arranged such that a passenger sitting on a seat of the vehicle can visually recognize when charging is in progress.

2. Background Information

Electric vehicles have been developed in which a charging port is provided on a radiator grill on a front end portion of the vehicle. Charging is conducted by inserting a charging plug into the charging port. The charging port of the electric vehicle disclosed in Japanese Laid-Open Patent Publication No. 11-332003 has an opening formed in a radiator grill with a lid pivotally mounted to selectively open and close the opening in the radiator grill.

SUMMARY

It has been discovered that with the electric vehicle presented in Japanese Laid-Open Patent Publication No. 11-332003, it is difficult for a passenger sitting in the vehicle to visually recognize the open/close state of the lid because substantially the entire lid is stored inside the motor room when the lid is open. Thus, it is difficult for the passenger to recognize if a charging connector is still inserted into the charging port and there is a possibility that a driver of the vehicle will move the vehicle while charging is in progress.

One object of the present disclosure is to provide a vehicle charging port arrangement having a charging port lid that enables an open state of the lid to be visually recognized more readily.

In view of the state of the known technology, one aspect of this disclosure is to provide a vehicle charging port arrangement that mainly comprises a vehicle body, an electric charging port and a charging-in-progress indicator. The vehicle body includes a vehicle cabin and a vehicle front end portion having an upper surface. The electric charging port is arranged on the vehicle front end portion. The electric charging port is configured to receive an electric charging connector. The charging-in-progress indicator is movably mounted to the vehicle front end portion to move in a vertical direction between a charging port access position that provides access to the electric charging port and a charging port blocking position that prevents access to the electric charging port. The charging-in-progress indicator is visible from inside the vehicle cabin looking over the upper surface of the vehicle front end portion while the charging-in-progress indicator is in the charging port access position.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
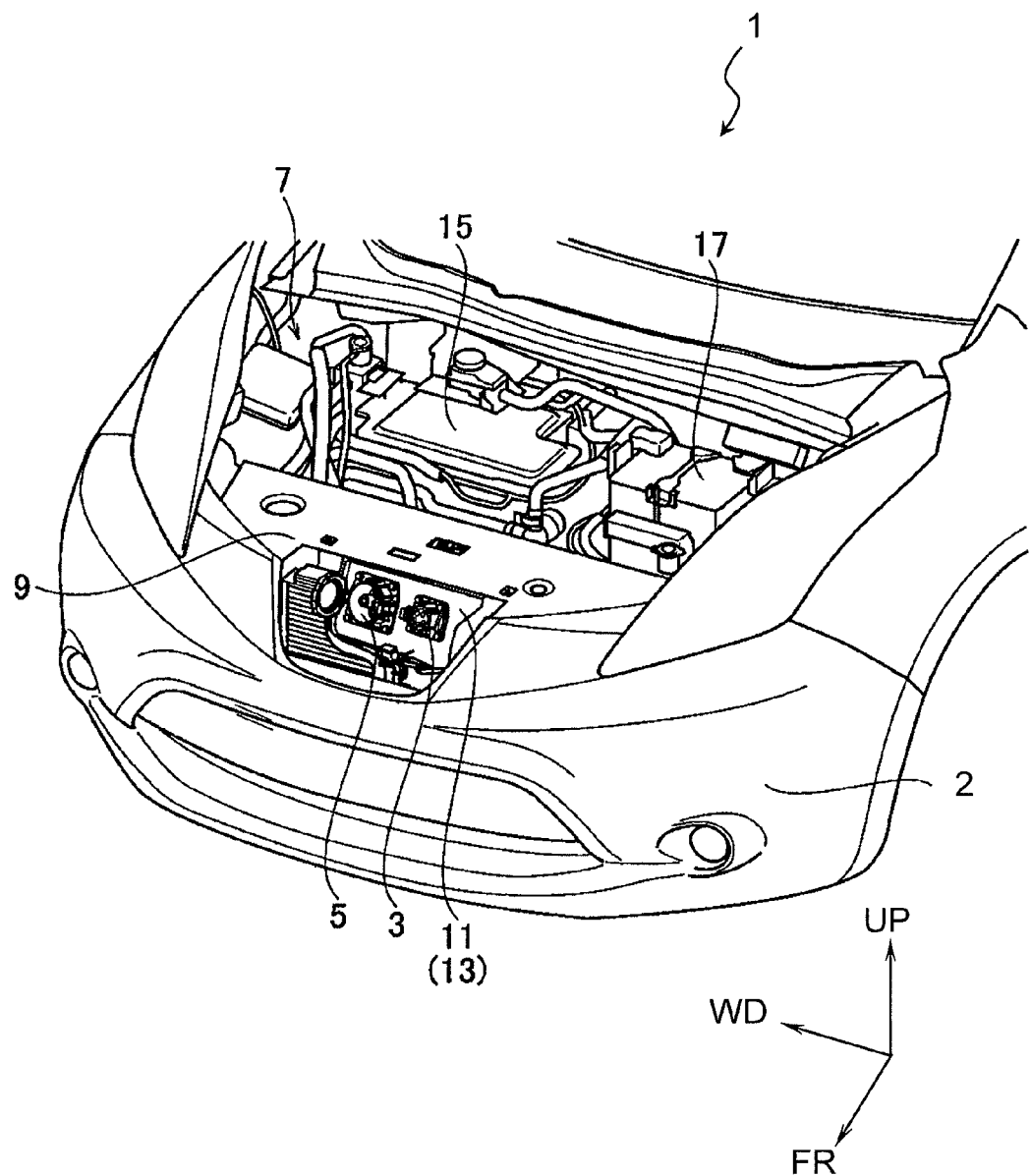
FIG. 1 is a perspective view of a frontward portion of a vehicle body that includes a vehicle charging port arrangement according to one illustrated embodiment.

Referring initially to FIG. 1, a frontward portion of a vehicle 1 is illustrated that includes a vehicle charging port arrangement in accordance with a first embodiment. More specifically, FIG. 1 shows an inside view of a motor room of a vehicle body 1a of the vehicle 1. In the figures, an arrow FR indicates a frontward direction of the vehicle 1, an arrow UP indicates an upward direction of the vehicle 1, and an arrow WD indicates a widthwise direction of the vehicle 1. The vehicle charging port arrangement is part of the vehicle body 1a. The vehicle 1 is illustrated as an electric vehicle, but can also be configured as a hybrid vehicle or a fuel cell vehicle.

As seen in FIG. 1, the vehicle body 1a includes a vehicle front end portion 2 that is arranged on a forward end of the vehicle 1 and extends along a widthwise direction of the vehicle 1. The vehicle front end portion 2 can include various conventional components such as a hood, a pair of fenders, a front bumper, a front end module, a front fascia panel, etc. The vehicle 1 further includes a first electric charging port 3 and a second electric charging port 5. In the illustrated embodiment, the first and second charging ports 3 and 5 are disposed on an upper portion of the vehicle front end portion 2 of the vehicle 1 in a widthwise middle portion with respect to the vehicle front end portion 2. More specifically, the vehicle body 1a further includes a support member 9 that is provided on a front side of a motor room 7 of the vehicle 1. The support member 9 has a recess 11 provided in a front face of the support member 9. The two charging ports 3 and 5 are arranged on a vertical wall surface 13 that forms the recess 11. The first and second charging ports 3 and 5 are arranged horizontally adjacent to each other such that the first charging port 3 is arranged on a left side and the second charging port 5 is arranged on a right side with respect to a passenger seating in the vehicle cabin. The first charging port 3 is configured for low-speed charging (e.g., using a 100-V or 200-V power source) that requires a longer period of time. The second charging port 5 is configured for high-speed charging (e.g., using a 400-V power source) that can be completed in a short period of time.

The vehicle 1 further includes an inverter 15 and an auxiliary battery 17. The inverter 15 is arranged inside of the motor room 7 at a central portion of the motor room 7. The battery 17 is arranged next to a leftward end of the inverter 15 with respect to a passenger seating in the vehicle cabin. The inverter 15 serves to control an electric current transmitted from a vehicle drive battery to a vehicle drive motor in accordance with a depression amount of an accelerator pedal. The auxiliary machine battery 17 serves to supply electric power to auxiliary electrical components such as an air conditioning system, lamps, etc., as in a typical gasoline engine.

Figure 2:
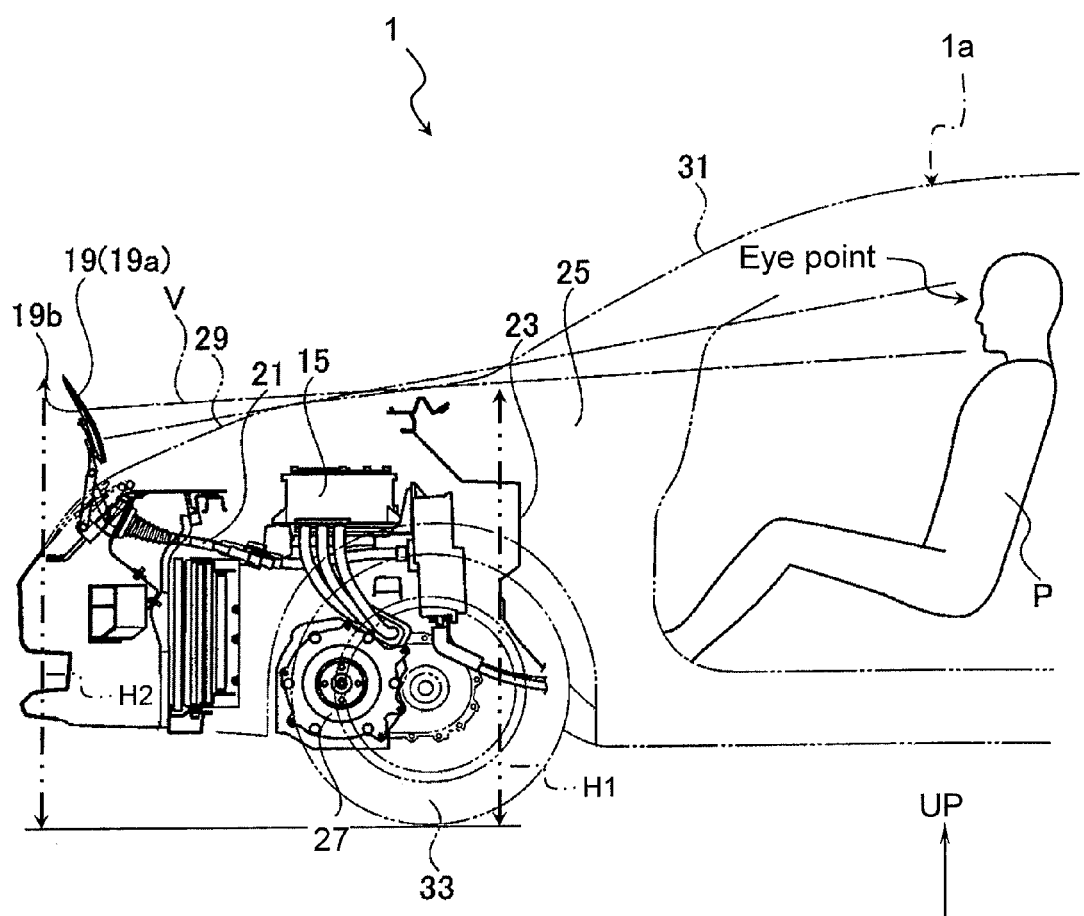
FIG. 2 is a cross sectional side view of a frontward portion of the vehicle body shown in FIG. 1.

As shown in FIG. 2, the vehicle 1 further includes a charging port lid 19 that is provided on a frontward end of the vehicle 1 for selectively covering the charging ports 3 and 5. The charging port lid 19 has an exterior surface that is flush with the exterior surface of the vehicle body 1a that surrounds the charging port lid 19. The charging port lid 19 is swingably arranged in a vertical direction about a horizontal pivot axis between an open position that provides access to the charging ports 3 and 5 and a closed position that covers the charging ports 3 and 5. The charging ports 3 and 5 are connected to the vehicle drive battery (not shown) through a cable 21 that extends in a rearward direction from the charging ports 3 and 5. Thus, the charging port lid 19 constitutes a charging-in-progress indicator that is movably mounted to the vehicle front end portion 2 to move in a vertical direction between a charging port access (open) position that provides access to the electric charging port and a charging port blocking (closed) position that prevents access to the electric charging ports 3 and 5. In particular, the charging port lid 19 constitutes a charging-in-progress indicator because the charging port lid 19 is visible from inside a vehicle cabin 25 looking over the upper surface (e.g., a motor room hood 29) of the vehicle front end portion 2 while the charging port lid 19 (charging-in-progress indicator) is in the charging port access (open) position. Thus, with the illustrated embodiment, the charging port lid 19 (charging-in-progress indicator) vehicle charging port arrangement for a lid of a charging port that enables an open state of the lid to be visually recognized more readily by a seated passenger.

As shown in FIG. 2, the vehicle 1 further includes a dash panel 23 that extends in a vertical direction. The dash panel 23 is arranged at a rearward end of the motor room 7. The dash panel 23 separates the motor room 7 from the vehicle cabin 25. The vehicle 1 further includes a motor 27 that is arranged below the inverter 15. The motor 27 and the inverter 15 are electrically connected together with wiring. The motor room hood 29 of the vehicle front end portion 2 serves to cover an upper opening of the motor room 7. The vehicle 1 also includes a front windshield 31 that extends diagonally rearward and upward from a rearward end portion of the hood 29. The vehicle 1 is also provided with four wheels 33 (only one shown) with at least one of the wheels 33 being rotatably driven by the motor 27.

As shown in FIG. 2, at least a portion (an upper portion in this embodiment) of the charging port lid 19 is positioned higher than a highest portion of the hood 29 when the lid 19 is in an open state. In this way, a seated passenger P sitting in a front driver's seat of the vehicle 1 can visually recognize that the lid 19 is in a fully open state. In other words, when the lid 19 is fully open, the lid 19 is arranged in a region V where the lid 19 is visible to the seated passenger P sitting in a front driver's seat of the vehicle 1. As shown in FIG. 2, the region V is defined by single-dot chain lines extending toward the frontward end of the vehicle and passing through an upper surface of the hood 29. In the illustrated embodiment, the hood 29 and the lid 19 are arranged with respect to each other such that the eye point of the seated passenger P corresponds to location of the eye of a 50th percentile adult male occupant seated in the driver's seat.

With the illustrated embodiment, at least a portion of the lid 19 is positioned higher than a highest portion of an upper surface of the hood 29 when the lid 19 is in an open position. In other words, as shown in FIG. 2, the uppermost point of the upper surface of the hood 29 has a hood height H1, as measured from the ground, which is smaller than the highest portion of the lid 19 in the open position, which has an open lid height H2 as measured from the ground. As a result, the seated passenger P sitting in a front driver's seat of the vehicle 1 can easily see if an electric charging plug or connector 65 or 67 is inserted into one of the charging ports 3 and 5. Thus, the possibility that the vehicle 1 will be moved during charging can be reduced.

While the lid 19 of this illustrated embodiment is visible to the seated passenger P sitting in a front driver's seat of the vehicle 1 when the lid 19 is in a fully open state, the configuration of the lid 19 is not limited to this configuration. Rather, the lid 19 just needs to be in a position in which the charging connector 65 and/or the charging connector 67 can be inserted into one of the charging ports 3 and 5. In other words, the expressions "open state" and "open position" includes any state (e.g., half open) of the lid 19 in which a charging connector can be inserted into one of the charging ports 3 and 5. However, the expressions "open state" and "open position" do not include any state of the lid 19 in which a charging connector cannot be inserted into one of the charging ports 3 and 5. The purpose of the positioning of the lid 19 (i.e., a charging-in-progress indicator), as disclosed herein, is for the seated passenger P sitting in a front driver's seat of the vehicle 1 to be able to use the lid 19 as a check to determine if charging is in progress.

Figure 3:
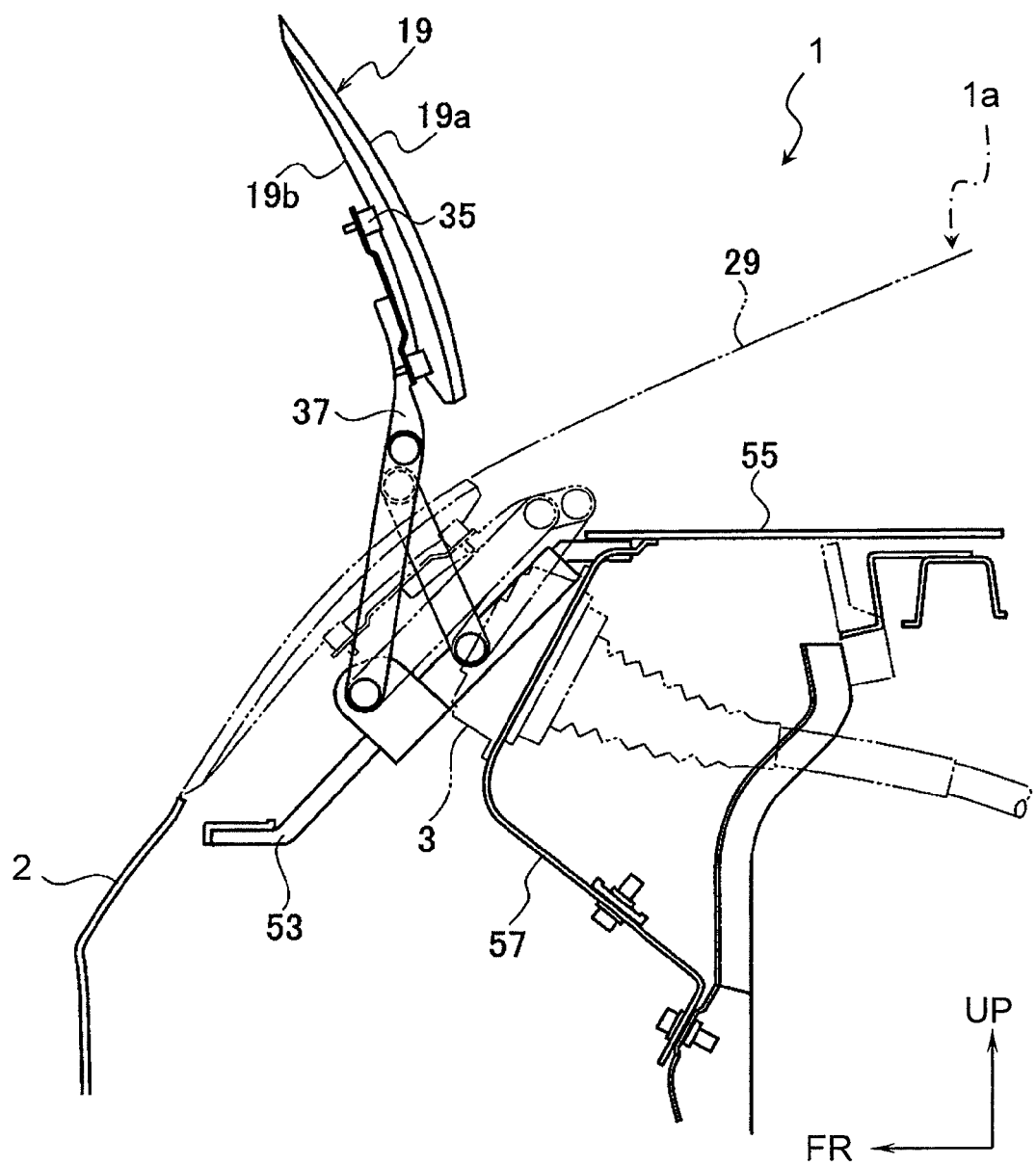
FIG. 3 is an enlarged cross sectional view of a portion of FIG. 2 in a vicinity of a lid.
Figure 4:
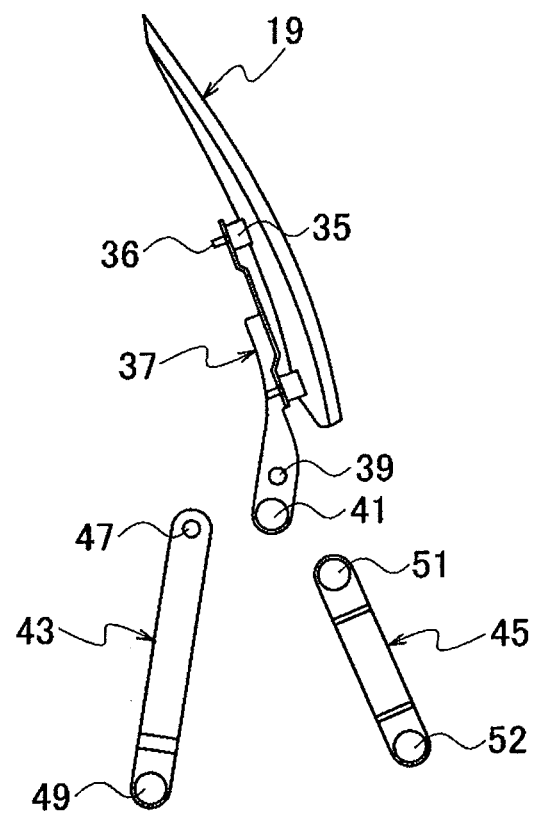
FIG. 4 is a side view of the lid in a disassembled state.
Figure 5:
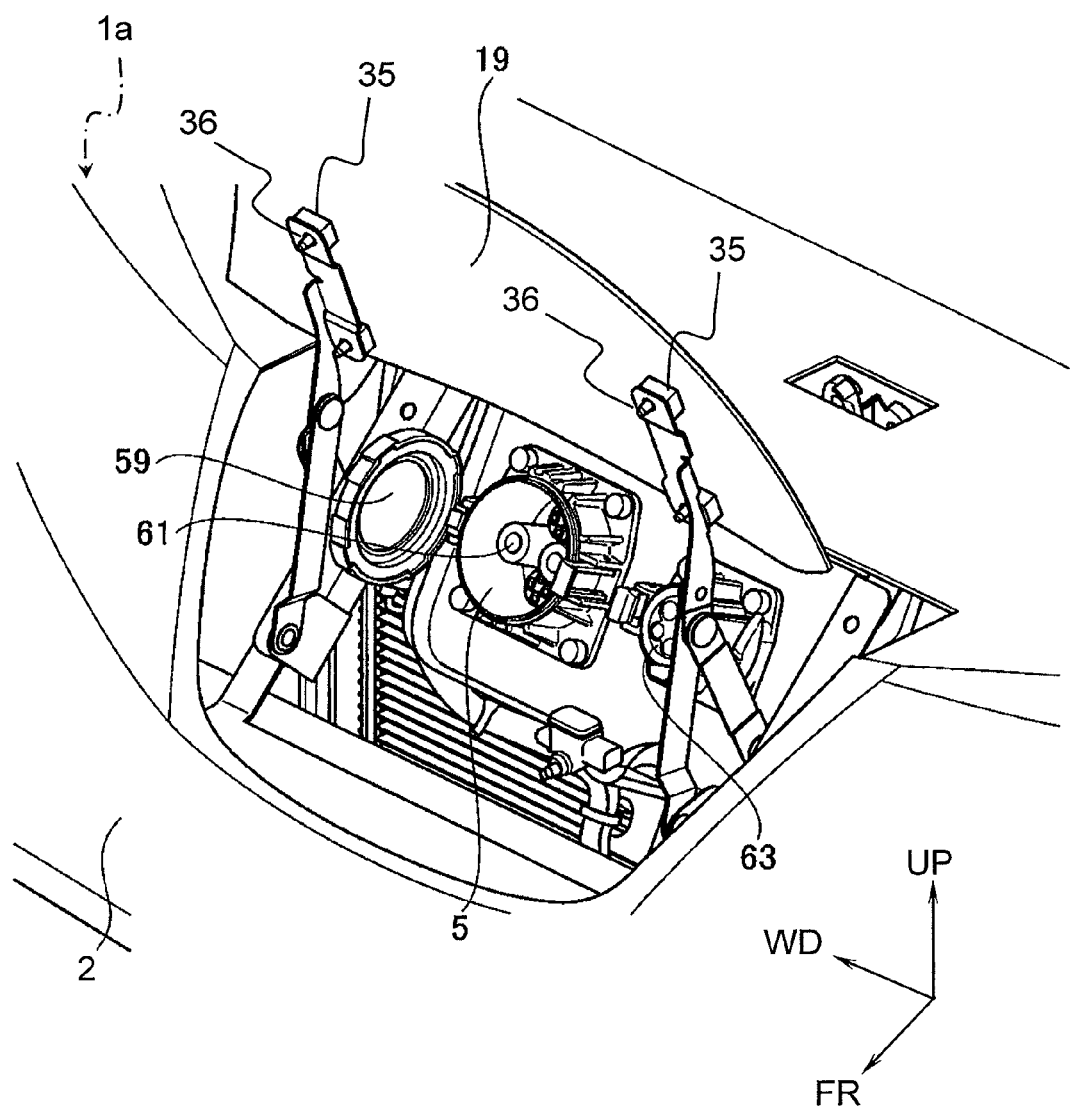
FIG. 5 is an enlarged perspective view of the charging ports according to the illustrated embodiment.

As shown in FIGS. 3 and 4, the lid 19 has a front surface 19a of the lid 19 (shown facing rearward in FIG. 3) a back surface 19b of the lid 19 (shown facing frontward in FIG. 3). The front surface 19a of the lid 19 is has a gradual curve, while the back surface 19b of the lid 19 has a pair of pedestals 35 provided thereon. Each of the pedestals 35 has a pin 36 that is protrudes from the pedestal 35. A lid-side arm 37 is attached to each of the pedestals 35 by the pins 36 as shown in FIGS. 4 and 5. As shown in FIG. 4, a small first support hole 39 and a larger second support hole 41 are provided in an end portion of the lid-side arm 37. A front body-side arm 43 is pivotally connected to the first support hole 39. A rear body-side arm 45 is pivotally connected to the second support hole 41. Shaft holes are provided in both ends of each of the front body-side arm 43 and the rear body-side arm 45. More specifically, a first shaft hole 47 and a second shaft hole 49 are provided in opposite ends of the front body-side arm 43. Also a first shaft hole 51 and a second shaft hole 52 are formed in opposite ends of the rear body-side arm 45. The front body-side arm 43 is pivotally joined to the lid-side arm 37 with a shaft member passing through the first shaft hole 47 and the first support hole 39. The rear body-side arm 45 is pivotally joined to the lid-side arm 37 with a shaft member passing through the first shaft hole 51 and the second support hole 41. Thus, the lid-side arms 37, the front body-side arms 43 and the rear body-side arms 45 form an open/close (hinge) structure that is operatively coupled between the vehicle front end portion 2 and the charging port lid 19.

As shown in FIG. 3, a support plate 53 is arranged in a position rearward of the hood 29 and the vehicle front end portion 2 for pivotally supporting the front body-side arm 43 and the rear body-side arm 45 at the respective second shaft holes 49 and 52. In this way, a prescribed spacing exists between the support plate 53 and the hood 29 and the vehicle front end portion 2. A ceiling plate 55 and a support panel 57 are arranged rearward of the support plate 53. The first charging port 3 (indicated with a double-dot chain line) is fixed to the support panel 57. The lid 19 of the vehicle charging port arrangement is thus configured such that when the front surface 19a of the lid 19 is pushed frontward and downward, the front body-side arm 43, the rear body-side arm 45, and the lid-side arm 37 swings such that the lid 19 is closed.

FIG. 5 is an enlarged perspective view of charging ports 3 and 5 with the lid 19 fully open. As explained previously with reference to FIG. 1, the first charging port 3 and the second charging port 5 are arranged side by side such that the first charging port 3 is on the left from the perspective of the seated passenger P and the second charging port 5 is on the right from the perspective of the seated passenger P. A cap 69 is detachably attached to the first charging port 3. A cap 59 is detachably attached to the second charging port 5. The first charging port 3 has a smaller diameter than the second charging port 5. Each of the charging ports 3 and 5 is provided with a socket contact 61 or 63. Thus, in this embodiment, the lid 19 is a single common lid that serves as both a lid for simultaneously opening and closing access to the first charging port 3 and the second charging port 5.

Figure 6:
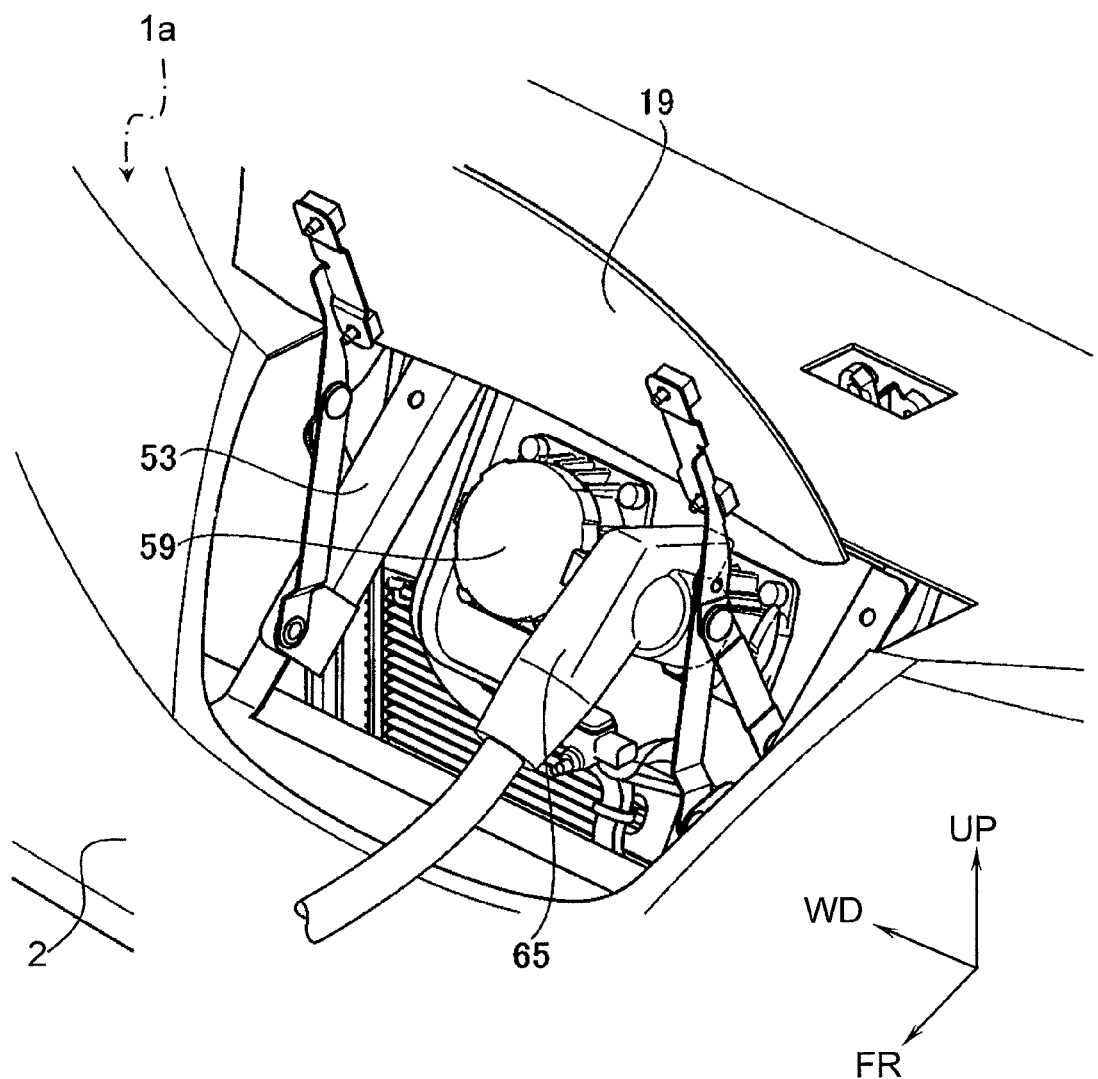
FIG. 6 is a perspective view of the charging ports shown in FIG. 5 with a charging connector inserted into a first charging port.
Figure 7:
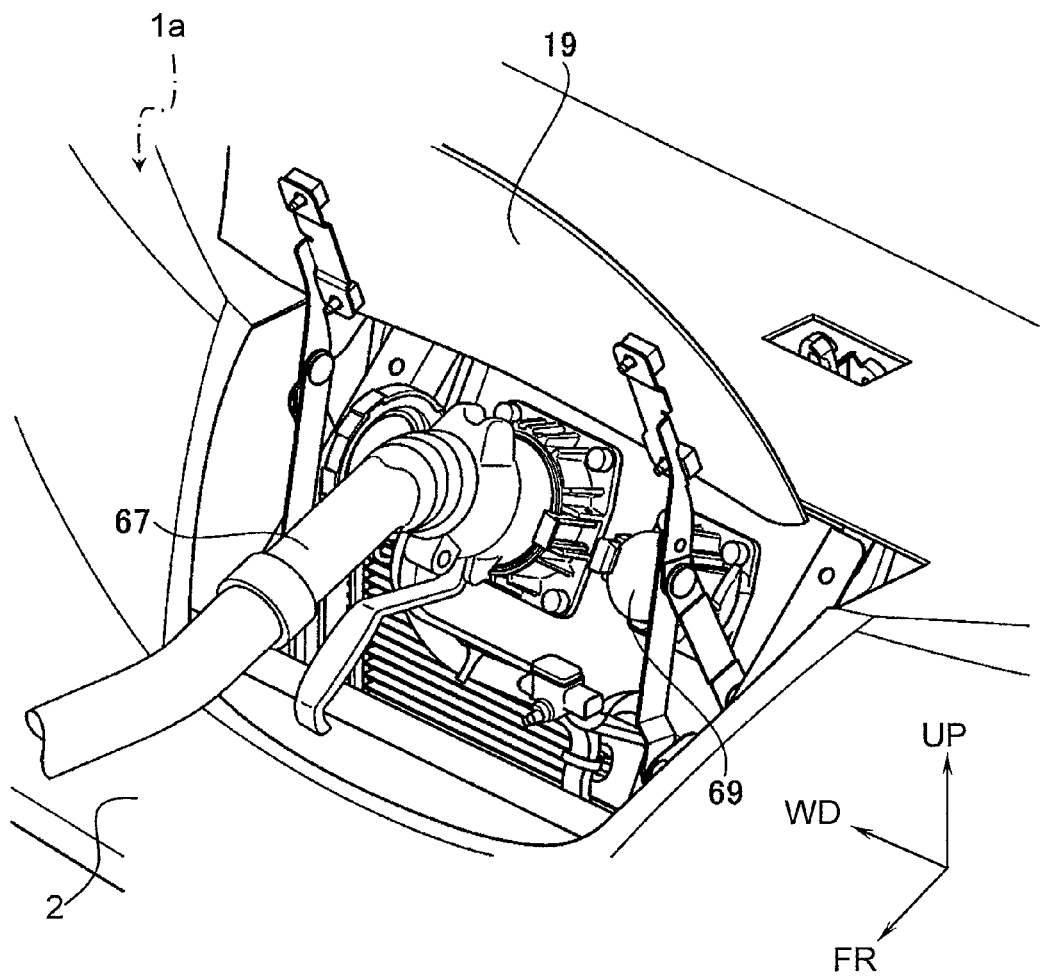
FIG. 7 is a perspective view of the charging ports shown in FIG. 5 with a charging connector inserted into a second charging port.

A procedure for inserting the charging connector 65 into the first charging port 3 for conducting electric charging and a procedure for inserting the charging connector 67 into the second charging port 5 for conducting electric charging will now be explained briefly. When charging is conducted using the first charging port 3, the lid 19 is opened fully upward and the cap 69 is removed. Then, as shown in FIG. 6, the charging connector 65 is inserted into the socket connector 63. A switch (not shown in the figures) is then turned on to conduct charging. Since the lid 19 is in the opened position, the lid 19 can be seen by the passenger P sitting on the driver's seat, as shown in FIG. 2. When charging is conducted using the second charging port 5, the lid 19 is moved to the opened position and the cap 59 is removed. Then, as shown in FIG. 7, the charging connector 67 is inserted into the socket connector 63. A switch (not shown in the figures) is then turned on to conduct charging. Since the lid 19 is in the opened position, the lid 19 can be seen by the passenger P sitting on the driver's seat, as shown in FIG. 2.

Some operational effects obtained with the illustrated embodiment will now be explained. As mentioned above, the vehicle charging port arrangement according to this embodiment includes the charging ports 3 and 5 arranged on the support panel 57 at a front end portion of the hood 29. The lid 19 is swingable in a vertical direction so as to open and close access to the charging ports 3 and 5. When the lid 19 is open, at least a portion (i.e., an upper portion) thereof is positioned higher than a highest portion of an upper surface of the hood 29. Thus, it is easy to recognize if the charging connector 65 or 67 is still inserted into one of the charging ports 3 and 5 and it is less likely that a driver of the vehicle will move the vehicle while charging is in progress.

The charging ports 3 and 5 are provided closely adjacent to each other and the lid 19 serves as a common lid to simultaneously open and close access to the closely adjacent charging ports 3 and 5. As a result, the number of parts and the cost of the structure can be reduced. Since the first and second charging ports 3 and 5 are arranged horizontally side-by-side and closely adjacent to each other, the vertical range of motion through which the lid 19 is swung in order to be opened and closed can be reduced and a horizontal dimension of the lid 19 can be reduced.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also as used herein to describe the above embodiment(s), the following directional terms "forward, rearward, above, downward, vertical, horizontal, below and transverse" as well as any other similar directional terms refer to those directions of a vehicle equipped with the vehicle charging port arrangement. Accordingly, these terms, as utilized to describe the present invention should be interpreted relative to a vehicle equipped with the vehicle charging port arrangement.

While only selected embodiments have been chosen to illustrate the present invention, it will be apparent to those skilled in the art from this disclosure that various changes and modifications can be made herein without departing from the scope of the invention as defined in the appended claims. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle charging port arrangement comprising:
    a vehicle body including a vehicle cabin and a vehicle front end portion having an upper surface;
    an electric charging port arranged on the vehicle front end portion, with the electric charging port being configured to receive an electric charging connector; and
    a charging-in-progress indicator movably mounted to the vehicle front end portion to move between a charging port access position that provides access to the electric charging port and a charging port blocking position that prevents access to the electric charging port, with the charging-in-progress indicator being visible from inside the vehicle cabin looking over the upper surface of the vehicle front end portion while the charging-in-progress indicator is in the charging port access position.

2. The vehicle charging port arrangement as recited in claim 1, wherein
    an upper most point of the charging-in-progress indicator is located higher than a point of intersection between the charging-in-progress indicator and a line that passes through an eye point of a seated passenger and is tangent to the upper surface of the vehicle front end portion while the charging-in-progress indicator is in the charging port access position.

3. The vehicle charging port arrangement as recited in claim 1, wherein
    the upper surface of the vehicle front end portion is located lower than a line connecting an eye point of a seated passenger and an upper most point of the charging-in-progress indicator while the charging-in-progress indicator is in the charging port access position.

4. The vehicle charging port arrangement as recited in claim 1, wherein
    the charging-in-progress indicator includes a charging port lid movably arranged with respect to the vehicle front end portion between an open position corresponding to the charging port access position and a closed position corresponding to the charging port blocking position.

5. The vehicle charging port arrangement as recited in claim 4, wherein
the vehicle front end portion includes a motor room hood with the upper surface of the vehicle front end portion being at least partially formed by the motor room hood.

6. The vehicle charging port arrangement as recited in claim 4, further comprising
at least one additional electric charging port arranged adjacent to the electric charging port with the charging port lid being a single common lid that simultaneously exposes the at least one additional electric charging port and the electric charging port while the lid is in the open position and simultaneously covers the at least one additional electric charging port and the electric charging port while the lid is in the closed position.

7. The vehicle charging port arrangement as recited in claim 6, wherein
the at least one additional electric charging port and the electric charging port are arranged horizontally side-by-side so as to be closely adjacent to each other.

8. The vehicle charging port arrangement as recited in claim 2, wherein
the charging-in-progress indicator includes a charging port lid movably arranged with respect to the vehicle front end portion between an open position corresponding to the charging port access position and a closed position corresponding to the charging port blocking position.

9. The vehicle charging port arrangement as recited in claim 8, wherein
the vehicle front end portion includes a motor room hood with the upper surface of the vehicle front end portion being at least partially formed by the motor room hood.

10. The vehicle charging port arrangement as recited in claim 8, further comprising
at least one additional electric charging port arranged adjacent to the electric charging port with the charging port lid being a single common lid that simultaneously exposes the at least one additional electric charging port and the electric charging port while the lid is in the open position and simultaneously covers the at least one additional electric charging port and the electric charging port while the lid is in the closed position.

11. The vehicle charging port arrangement as recited in claim 10, wherein
the at least one additional electric charging port and the electric charging port are arranged horizontally side-by-side so as to be closely adjacent to each other.

12. The vehicle charging port arrangement as recited in claim 3, wherein
the charging-in-progress indicator includes a charging port lid movably arranged with respect to the vehicle front end portion between an open position corresponding to the charging port access position and a closed position corresponding to the charging port blocking position.

13. The vehicle charging port arrangement as recited in claim 12, wherein
the vehicle front end portion includes a motor room hood with the upper surface of the vehicle front end portion being at least partially formed by the motor room hood.

14. The vehicle charging port arrangement as recited in claim 12, further comprising
at least one additional electric charging port arranged adjacent to the electric charging port with the charging port lid being a single common lid that simultaneously exposes the at least one additional electric charging port and the electric charging port while the lid is in the open position and simultaneously covers the at least one additional electric charging port and the electric charging port while the lid is in the closed position.

15. The vehicle charging port arrangement as recited in claim 14, wherein
the at least one additional electric charging port and the electric charging port are arranged horizontally side-by-side so as to be closely adjacent to each other.

16. The vehicle charging port arrangement as recited in claim 5, wherein
at least one additional electric charging port arranged adjacent to the electric charging port with the charging port lid being a single common lid that simultaneously exposes the at least one additional electric charging port and the electric charging port while the lid is in the open position and simultaneously covers the at least one additional electric charging port and the electric charging port while the lid is in the closed position.

17. The vehicle charging port arrangement as recited in claim 16, wherein
the at least one additional electric charging port and the electric charging port are arranged horizontally side-by-side so as to be closely adjacent to each other.

18. The vehicle charging port arrangement as recited in claim 9, wherein
at least one additional electric charging port arranged adjacent to the electric charging port with the charging port lid being a single common lid that simultaneously exposes the at least one additional electric charging port and the electric charging port while the lid is in the open position and simultaneously covers the at least one additional electric charging port and the electric charging port while the lid is in the closed position.

19. The vehicle charging port arrangement as recited in claim 18, wherein
the at least one additional electric charging port and the electric charging port are arranged horizontally side-by-side so as to be closely adjacent to each other.

20. The vehicle charging port arrangement as recited in claim 13, wherein
at least one additional electric charging port arranged adjacent to the electric charging port with the charging port lid being a single common lid that simultaneously exposes the at least one additional electric charging port and the electric charging port while the lid is in the open position and simultaneously covers the at least one additional electric charging port and the electric charging port while the lid is in the closed position.

21. The vehicle charging port arrangement as recited in claim 20, wherein
the at least one additional electric charging port and the electric charging port are arranged horizontally side-by-side so as to be closely adjacent to each other.

* * * * *